March 18, 1930.  A. M. MALLUK  1,750,849
COMBINED CLOSURE AND GAUGE ROD FOR OIL TANKS
Filed Sept. 6, 1928  2 Sheets-Sheet 1
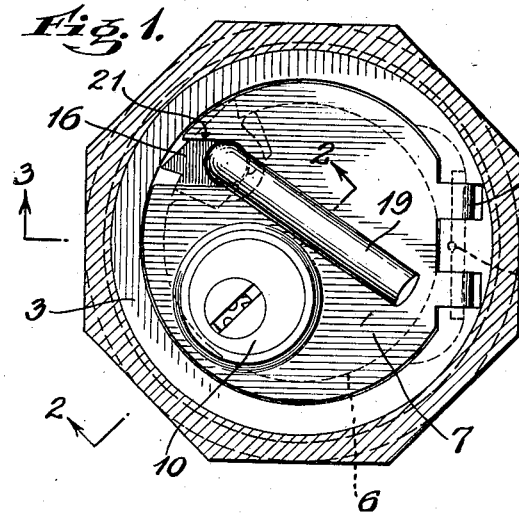
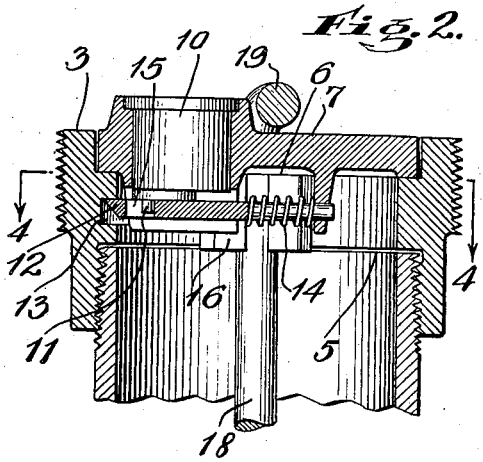
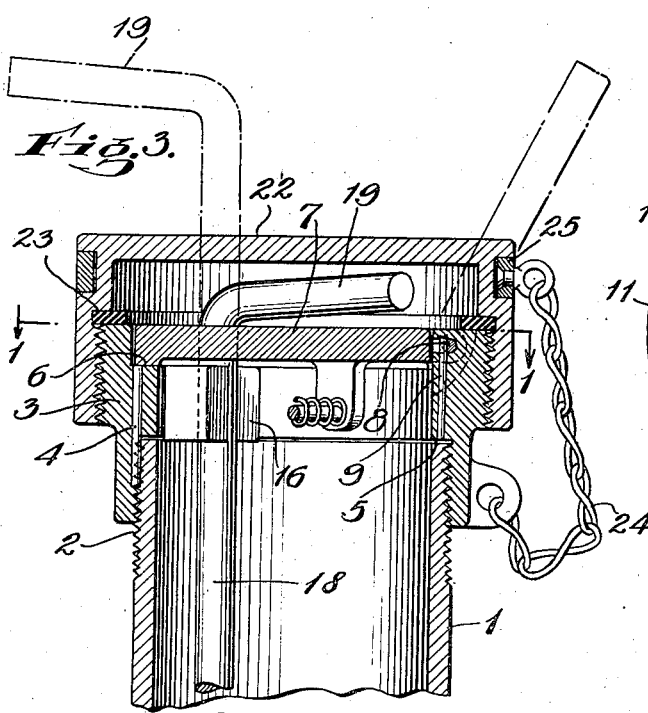
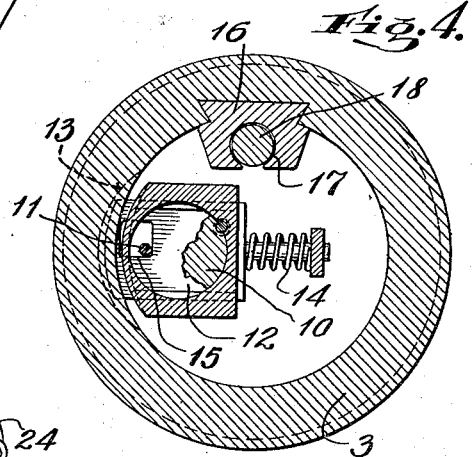
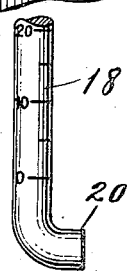
INVENTOR.
ASSAD M. MALLUK
BY Pennie, Davis, Marvin & Edmonds
his ATTORNEYS.

March 18, 1930. A. M. MALLUK 1,750,849
COMBINED CLOSURE AND GAUGE ROD FOR OIL TANKS
Filed Sept. 6, 1928    2 Sheets-Sheet 2
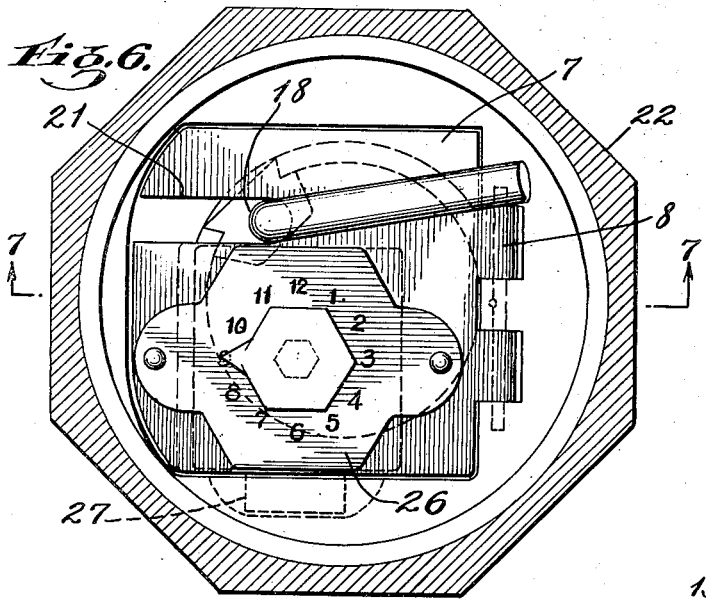
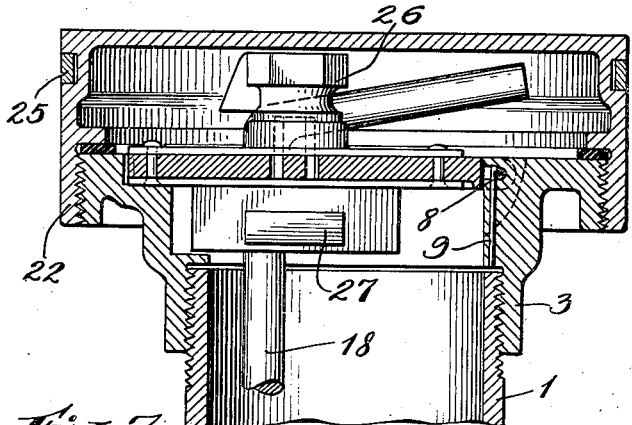
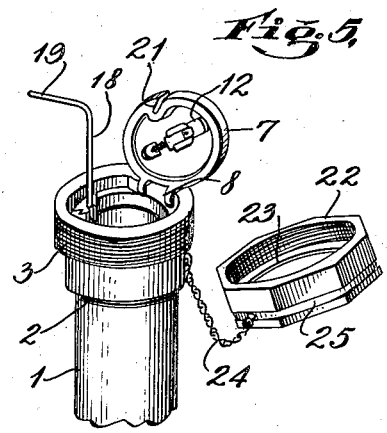
INVENTOR.
ASSAD M. MALLUK
BY Pennie, Davis, Marvin & Edmonds
ATTORNEYS.

Patented Mar. 18, 1930

1,750,849

UNITED STATES PATENT OFFICE

ASSAD M. MALLUK, OF NEW YORK, N. Y., ASSIGNOR TO STANDARD LOCK AND MEASURE CORPORATION, OF NEW YORK, N. Y., A CORPORATION OF NEW YORK

COMBINED CLOSURE AND GAUGE ROD FOR OIL TANKS

Application filed September 6, 1928. Serial No. 304,224.

This invention relates to lockable closures for tanks, particularly fuel oil tanks, and has for its object the provision of means whereby the filling neck can be locked against unauthorized additions of oil while still permitting the unhindered use of a gauge rod in the neck.

Oil companies selling nationally advertised brands of gasoline lose annually thousands of dollars in business and good will through the practice of unscrupulous dealers of adding spurious and inferior gasoline to their service tanks and selling this counterfeit oil as the well-known product of the company. To guard against this loss the companies would undoubtedly lock their tanks were it not for the fact that the service station operator must be permitted, from time to time, to measure the gasoline in the tanks. This is done almost universally by inserting a gauge rod through the filling neck, so that if the closure on this neck were locked it would obviously be impossible to gauge the tank and the service station operator would be put to a very serious inconvenience. According to the present invention I have overcome this difficulty by mounting a gauge rod in the filling neck and providing a lockable closure which can be opened and closed independently of the rod, the arrangement permitting the operator to measure freely the contents of his tank but making it impossible for him to add bootleg gasoline in defraud of the rights of the public and the company under whose name he is selling.

In the accompanying drawings I have illustrated two preferred embodiments of my invention. In these drawings, Figure 1 is a plan view of the closure showing an over-all cap in section; the view is taken along line 1—1 of Figure 3;

Figure 2 is a vertical section taken along line 2—2 of Figure 1;

Figure 3 is a vertical section taken along line 3—3 of Figure 1;

Figure 4 is a horizontal section taken along line 4—4 of Figure 2;

Figure 5 is a perspective of the closure illustrated in the preceding figures with the over-all cap removed and the cover open;

Figure 6 is a view similar to Figure 1, but showing the use of a combination lock, and Figure 7 is a vertical section taken along line 7—7 of Figure 6.

The closure illustrated is primarily intended for use on gasoline service tanks but can, of course, be used on any tank containing liquid which must be measured from time to time but which should be sealed against unauthorized additions. Practically every gasoline service tank in use is provided with a single fill opening usually in the form of a neck extending vertically upward from the tank. In the drawings such a neck is illustrated at 1. It is provided with a threaded mouth 2 of standard size on which an ordinary screw threaded cap is usually mounted. When the closure of the present invention is used this cap is permanently removed.

The closure of the present invention comprises first a threaded collar 3 adapted to be mounted on the threaded mouth of the neck. The union of the collar and the neck is made permanent by means of a pin 4 driven through interfitting threads. The collar is preferably provided with an annular shoulder 5 which abuts against the upper end of the neck, the inner diameter of the collar above this point being the same as that of the neck. The upper end of the collar is provided with a second annular shoulder 6, upon which rests, when closed, the cover 7. This cover is hinged to the collar at 8, and permanently connected thereto, in the form illustrated, by means of a pin 9. The cover is provided with a lock comprising a barrel 10, a pin 11, and a bolt 12, the latter extending, when the cover is locked, within a recess 13 in the collar. The bolt is normally urged into locked position by means of a spring 14. The pin 9 lies within wide slot 15 in the bolt which is of sufficient size to permit the cover to close when the bolt is in locked position, the bolt snapping into the recess 13 when the cover rests upon the shoulder 6.

Within the inner wall of the collar is mounted a guide block 16 which rests upon the upper end of the filling neck and is preferably removable when the cover is open. This guide block is provided with a vertical guideway 17 adapted to receive this gauge rod 18. This gauge rod is preferably of metal and is provided with the usual figures indicating the depth of gasoline in the tank and calibrated to read in gallons for tanks of a given size and shape. The upper end of the rod is provided with a crook 19 which serves as a handle and also prevents the lower end of the rod from striking the tank bottom. The lower end of the rod is also provided with a crook 20 which prevents removal of the rod through the guideway.

In order to make possible the use of the rod when the cover is locked, the cover is provided with a slot 21 cut normal to the axis of the hinge 8 so that the cover can be raised and lowered with the rod in place. It will be noted that the guide block 16 lies immediately below this slot and thus, with the rod, completely seals it when the cover is closed, making impossible the unauthorized addition of liquid to the tank.

The cover and rod are both enclosed by a screw-threaded cap mounted upon the collar, and making a gas and liquid-tight seal therewith by means of a gasket 23. The cap is secured to the collar by means of a chain 24 extending from the collar to a sliding ring 25 on the cap.

Gasoline tanks are commonly filled by a hose from the tank wagon terminating in a nozzle which is inserted within the filling neck. Sometimes, however, a threaded union is made with the neck. To use such a connection with my closure it would be necessary only to remove the cover and to do this the pin 9 can be eliminated and the cover lifted out.

In Figures 6 and 7 I have illustrated a modified form of closure in which the barrel lock illustrated in Figures 1, 2, 4 and 5 is replaced by means of a combination lock 26 provided with a bolt 27. This closure functions in the same manner as the one previously described.

It will be clear from the foregoing description that after the tank has been filled with genuine gasoline the cover 7 is locked and the key taken away by the tank wagon driver. The service tank operator therefore cannot gain access to the tank for the purpose of adding a spurious product, while at the same time he is free to engage in the necessary and wholly legitimate practice of measuring the contents of his tank.

My closure can be made and sold as a compact unit adapted to be mounted on standard size filling necks of tanks now installed and in use and permits a continuation of the common practice of filling and measuring through a single fill opening while at the same time affording complete protection to the oil companies without inconveniencing the service tank operators.

I claim:

1. A tank, a filling neck thereon, a gauge rod within the neck, a lockable cover on the neck, a slot in the cover permitting opening and closing of the cover without removing the rod and permitting use of the rod without opening the cover, and means for sealing the slot when the cover is closed.

2. An oil tank, a filling neck thereon, a collar mounted on the neck, a gauge rod within the neck, a cover on the collar for closing the neck, means for locking the cover in closed position, a guideway for the gauge rod supported by the collar below the cover, a slot in the cover for receiving the gauge rod so that the cover can be opened and closed without removing the rod and the rod used while the cover is closed, the guideway and gauge rod sealing the slot when the cover is closed thus making unauthorized additions of oil impossible.

3. A combined closure and gauge rod for oil tanks comprising the combination of a collar adapted to be fixedly mounted on the filling neck of the tank, a guide block mounted within the collar, a gauge rod slidable within the guide block, and a lockable cover mounted on the collar and provided with a slot through which the rod passes whereby the rod can be used when the cover is locked, the guide block serving to close that part of the slot not occupied by the rod and thus completely preventing the unauthorized addition of oil when the cover is locked.

In testimony whereof I affix my signature.

ASSAD M. MALLUK.